(12) United States Patent  
Taniguchi

(10) Patent No.: US 8,748,526 B2  
(45) Date of Patent: Jun. 10, 2014

(54) THERMOPLASTIC ELASTOMER COMPOSITION

(75) Inventor: Akio Taniguchi, Settsu (JP)

(73) Assignee: Kaneka Corporation, Osaka (JP)

( * ) Notice: Subject to any disclaimer, the term of this patent is extended or adjusted under 35 U.S.C. 154(b) by 217 days.

(21) Appl. No.: 12/439,418

(22) PCT Filed: Aug. 29, 2007

(86) PCT No.: PCT/JP2007/066749  
§ 371 (c)(1),  
(2), (4) Date: Feb. 27, 2009

(87) PCT Pub. No.: WO2008/026632  
PCT Pub. Date: Mar. 6, 2008

(65) Prior Publication Data  
US 2010/0016495 A1    Jan. 21, 2010

(30) Foreign Application Priority Data

Sep. 1, 2006   (JP) .................................. 2006-238278

(51) Int. Cl.  
*C08L 19/00*     (2006.01)  
*C08L 67/02*     (2006.01)  
*C08L 67/04*     (2006.01)

(52) U.S. Cl.  
USPC ........... 524/502; 525/190; 528/392; 528/354; 264/239

(58) Field of Classification Search  
USPC .................. 524/502; 525/190; 528/392, 354; 264/239  
See application file for complete search history.

(56) References Cited

U.S. PATENT DOCUMENTS

| | | | | |
|---|---|---|---|---|
| 5,550,190 A * | 8/1996 | Hasegawa et al. | .......... | 525/92 A |
| 5,714,573 A * | 2/1998 | Randall et al. | ................ | 528/354 |
| 5,738,158 A * | 4/1998 | Ozawa et al. | ................. | 152/510 |
| 6,329,463 B1 * | 12/2001 | Abraham et al. | ........... | 525/92 A |
| 6,495,631 B1 * | 12/2002 | Randall et al. | ................ | 525/186 |
| 6,815,496 B2 * | 11/2004 | Tasaka et al. | ................... | 525/50 |
| 7,589,151 B2 * | 9/2009 | Aoki et al. | ...................... | 525/64 |
| 7,989,522 B2 * | 8/2011 | Odajima et al. | ............. | 523/351 |
| 8,281,832 B2 * | 10/2012 | Yagi et al. | ..................... | 152/450 |

FOREIGN PATENT DOCUMENTS

| | | |
|---|---|---|
| DE | 43 43 587 A1 | 6/1995 |
| EP | 1 669 406 A1 | 6/2006 |
| JP | 10-274494 A | 10/1998 |

(Continued)

OTHER PUBLICATIONS

JP 2005226054 A, Saito et al. Aug. 2005, Machine translation.*

(Continued)

*Primary Examiner* — Satya Sastri  
(74) *Attorney, Agent, or Firm* — Sughrue Mion, PLLC

(57) ABSTRACT

An object of the present invention is to provide: a thermoplastic elastomer composition, which is accompanied by less environmental burden, and which has flexibility, rubber elasticity, formability and recyclability; and a molded product obtained using the same. The present invention is directed to a thermoplastic elastomer composition comprising a thermoplastic resin (A) derived from a non-petroleum source, and at least one rubber (B) selected from a natural rubber, a diene polymer rubber, an olefin polymer rubber, an acrylic rubber and a silicone rubber, the thermoplastic elastomer composition being obtained by allowing the rubber (B) to be dynamically crosslinked with a crosslinking agent (C) in the presence of the thermoplastic resin (A). Preferred (A) is a polylactic acid, or a poly(3-hydroxybutyrate), and preferred (B) is a natural rubber.

12 Claims, 1 Drawing Sheet

(56) References Cited

FOREIGN PATENT DOCUMENTS

| JP | 2002-037984 A | | 2/2002 |
|---|---|---|---|
| JP | 2002-040598 A | | 2/2002 |
| JP | 2002-275303 A | | 9/2002 |
| JP | 2003-183488 A | | 7/2003 |
| JP | 2003-261734 A | | 9/2003 |
| JP | 2005-211041 A | | 8/2005 |
| JP | 2005-226054 A | | 8/2005 |
| JP | 2005-226057 A | | 8/2005 |
| JP | 2005226054 A | * | 8/2005 |
| JP | 2005-232231 A | | 9/2005 |
| JP | 2005-232232 A | | 9/2005 |
| JP | 2005-255722 A | | 9/2005 |
| JP | 2005-304484 A | | 11/2005 |
| JP | 2005-320409 A | | 11/2005 |
| JP | 2006-045366 A | | 2/2006 |
| JP | 2006-124538 A | | 5/2006 |
| JP | 2006-152162 A | | 6/2006 |
| WO | 03/035764 A1 | | 5/2003 |
| WO | 2005/042624 A1 | | 5/2005 |

OTHER PUBLICATIONS

Extended European Search Report issued in counterpart European Application No. 07806226.2 dated Sep. 17, 2012.
Han et al., Melt reaction in blends of poly(3-hydroxybutyrate-co-3-hydroxyvalerate) and epoxidized natural rubber, Polymer Degradation and Stability, 2004, vol. 85, pp. 947-955.

* cited by examiner

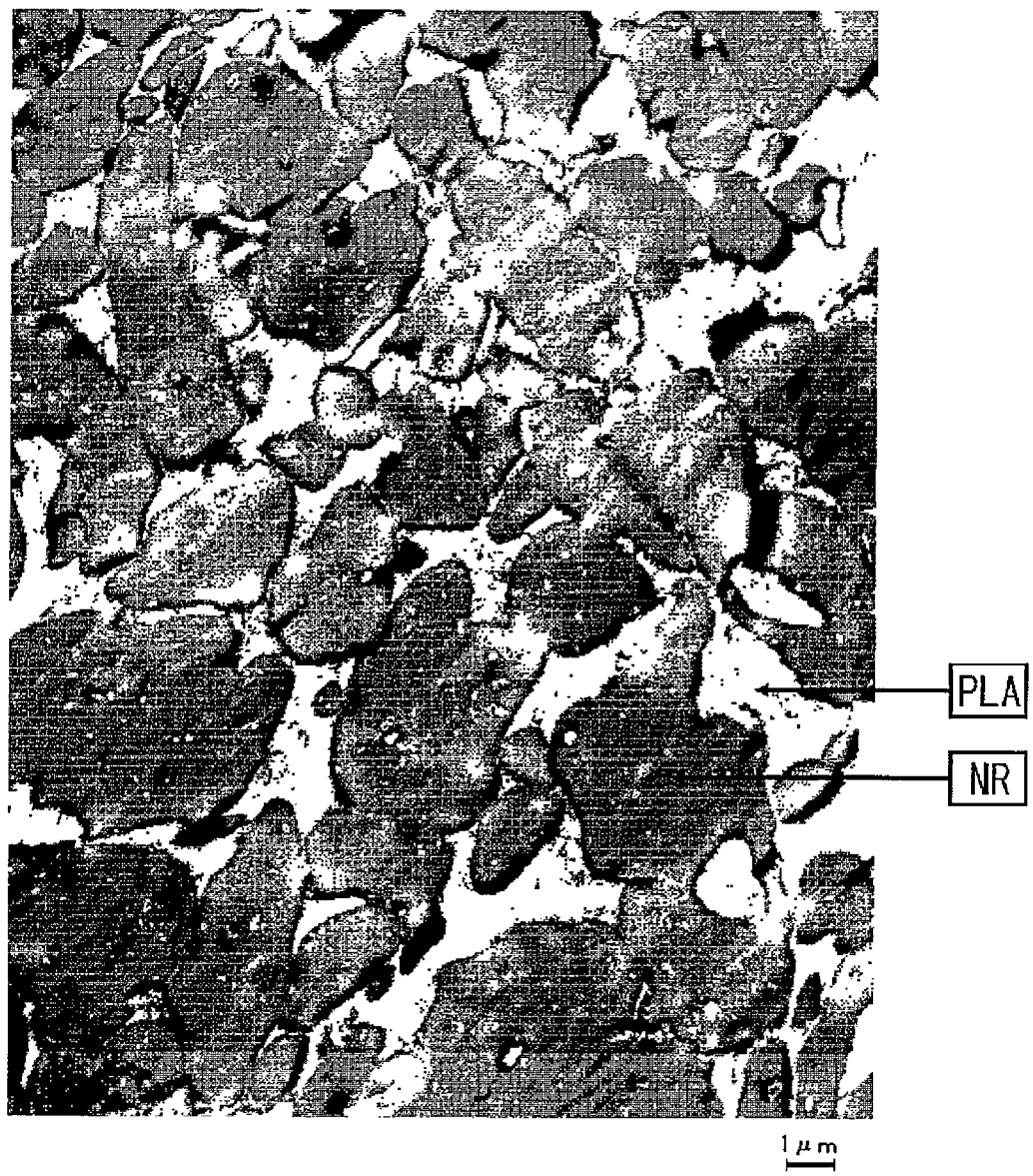

THERMOPLASTIC ELASTOMER COMPOSITION

CROSS REFERENCE TO RELATED APPLICATION

This application is a National Stage of International Application No. PCT/JP2007/066749 filed Aug. 29, 2007, claiming priority based on Japanese Patent Application No. 2006-238278, filed Sep. 1, 2006, the contents of all of which are incorporated herein by reference in their entirety.

TECHNICAL FIELD

The present invention relates to: a thermoplastic elastomer composition which is accompanied by less environmental burden, and which has flexibility, rubber elasticity, formability and recyclability; and a molded product obtained using the same. More specifically, the present invention relates to a thermoplastic elastomer composition constituted using a material derived from a non-petroleum source, and a molded product obtained using the same.

BACKGROUND ART

In recent years, environmental pollution caused by discarding plastics, global warming due to gasses generated in incineration of plastics, and the like have been problematic. Under such circumstances, for example, polylactic acid obtained by polymerization of lactic acid produced by fermentation of starch or the like, and the like have attracted attention as biodegradable plastics and carbon neutral materials (Patent Documents 1 and 2). Herein, the term "carbon neutral material" refers to a material which yields a small amount of discharge of carbon dioxide gas during the entire life cycle (from collecting the raw material until disposal).

The polylactic acid obtained from carbohydrates (starch and the like) produced by plants are accompanied by significantly smaller amount of a carbon dioxide gas generated during time periods from the manufacturing step to disposal step, as compared with general resins derived from petroleum (i.e., being carbon neutral).

Furthermore, similarly to polylactic acid, poly(3-hydroxybutyrate) polymers have also attracted attention (Patent Documents 3 and 4). The poly(3-hydroxybutyrate) polymers can be produced, for example, using a microorganism, from a methane gas obtained by fermentation of organic wastes such as garbage, food wastes and livestock excreta under anaerobic conditions, or from plant raw materials. In addition, the poly(3-hydroxybutyrate) polymers are biodegradable after the disposal, or are turned back to the methane gas by microorganisms, therefore, they are recyclable and environmentally friendly plastics.

Moreover, polybutylene succinate polymers have also attracted attention as materials accompanied by a smaller amount of carbon dioxide gas discharged, as compared with general resins derived from petroleum (Patent Document 5). The polybutylene succinate polymer can be manufacture by, for example, using succinic acid and a diol component as raw materials, and the succinic acid can be manufactured by fermentation of a saccharide such as sugarcane or maize.

As described in the foregoing, a variety of plastics constituted using a material derived from a non-petroleum source taking into consideration the environment have been developed so far. However, these plastics are inferior in flexibility, rubber elasticity, compression set property and the like, and many of these are also accompanied by difficulties in molding processing, whereby their applicable scope has been restricted.

Patent Document 1: Japanese Unexamined Patent Application, First Publication No. 2002-275303
Patent Document 2: Japanese Unexamined Patent Application, First Publication No. 2002-040598
Patent Document 3: Japanese Unexamined Patent Application, First Publication No. 2006-045366
Patent Document 4: Japanese Unexamined Patent Application, First Publication No. 2005-304484
Patent Document 5: Japanese Unexamined Patent Application, First Publication No. 2005-211041

DISCLOSURE OF THE INVENTION

Problems to be Solved by the Invention

An object of the present invention is to provide: a thermoplastic elastomer composition, which is accompanied by less environmental burden, and which has flexibility, rubber elasticity, formability and recyclability; and a molded product obtained using the same.

Means for Solving the Problems

The present invention relates to a thermoplastic elastomer composition which includes a thermoplastic resin (A) derived from a non-petroleum source, and at least one rubber (B) selected from a natural rubber, a diene polymer rubber, an olefin polymer rubber, an acrylic rubber and a silicone rubber, and which is obtained by dynamically crosslinking the rubber (B) in the presence of the thermoplastic resin (A) with use of a crosslinking agent (C).

Furthermore, the thermoplastic resin (A) of the present invention is preferably at least one polymer selected from a polylactic acid, a poly(3-hydroxybutyrate) polymer, a polybutylene succinate polymer, a polyglycolic acid and a polytrimethylene terephthalate polymer.

Moreover, the thermoplastic elastomer composition of the present invention preferably contains 5 to 150 parts by weight of the thermoplastic resin (A) based on 100 parts by weight of the rubber (B), and more preferably contains 10 to 90 parts by weight of the thermoplastic resin (A).

Further, the thermoplastic elastomer composition of the present invention preferably has a phase morphology in which a crosslinked product of the rubber (B) is dispersed in a continuous phase of the thermoplastic resin (A).

Additionally, in the thermoplastic elastomer composition of the present invention, the crosslinked product of the rubber (B) has a particle size of preferably 0.01 to 20 μm, and more preferably 0.01 to 10 μm.

Furthermore, in the thermoplastic elastomer composition of the present invention, the rubber (B) is preferably a natural rubber.

Moreover, in the thermoplastic elastomer composition of the present invention, the thermoplastic resin (A) is preferably polylactic acid or a poly(3-hydroxybutyrate) polymer.

Further, the thermoplastic elastomer composition of the present invention preferably further contains a plasticizer (D), and more preferably, the plasticizer (D) is a plasticizer derived from a non-petroleum source.

Additionally, the thermoplastic elastomer composition of the present invention preferably further contains a compatibility accelerator (E).

Still further, the thermoplastic elastomer composition of the present invention is preferably used as molded articles for automobiles, molded articles for electrical appliances, molded articles for office supplies, and molded articles for miscellaneous goods.

Effects of the Invention

Since the elastomer composition of the present invention is constituted with a material derived from a non-petroleum source, it is accompanied by less burden to environment, and is superior in flexibility, rubber elasticity, compression set properties and formability. In other words, the elastomer composition of the present invention can be suitably used in automobile parts, covering materials for electric wires, household electric appliances parts, medical parts, footwears, miscellaneous goods and the like, which have been conventionally manufactured using a thermoplastic elastomer predominantly constituted with a material derived from a petroleum source, and is environmentally friendly.

BRIEF DESCRIPTION OF THE DRAWINGS

The sole FIGURE of the drawings shows a view illustrating the phase morphology of the thermoplastic elastomer composition of the present invention observed with a transmission electron microscope (Example 5).

BEST MODE FOR CARRYING OUT THE INVENTION

The thermoplastic elastomer composition of the present invention includes a thermoplastic resin (A) derived from a non-petroleum source, and at least one rubber (B) selected from a natural rubber, a diene polymer rubber, an olefin polymer rubber, an acrylic rubber and a silicone rubber, and is obtained by allowing the rubber (B) to be dynamically crosslinked by a crosslinking agent (C) in the presence of the thermoplastic resin (A).

Thermoplastic Resin (A) Derived from Non-petroleum Source

The thermoplastic resin (A) derived from a non-petroleum source used in the present invention as herein referred to means a thermoplastic resin polymerized with a monomer obtained from a plant source or an animal source, or a monomer obtained from a plant source or an animal source through enzymatic degradation, fermentation or denaturation, as a principal component.

Examples of such a resin include aliphatic polyesters such as polyhydroxybutyrate, polybutylene succinate, polybutylene succinate/adipate, polyethylene succinate, a polylactic acid resin, polymalic acid and polyglycolic acid; aliphatic aromatic copolyesters such as polybutylene succinate/terephthalate and polytrimethylene terephthalate; mixtures of a natural polymer such as esterified starch or esterified cellulose and the aforementioned aliphatic polyester or aliphatic aromatic copolyester, and the like.

Among these, polylactic acids, poly(3-hydroxybutyrate) polymers, polybutylene succinate polymers, polyglycolic acid and polytrimethylene terephthalate based polymers are preferred in light of favorable availability of the raw material, and the extent of plasticity and mechanical physical properties of the resulting thermoplastic elastomer composition.

These polymer components may be used either alone, or in combination.

These thermoplastic resins (A) may be selected ad libitum taking into consideration the physical properties required, as well as the cost, availability of the raw material, and extent of reduction of the environmental burden, and the like. For example, polybutylene succinate polymers are preferred since they can be produced from raw materials of plant origin, and can impart excellent flexibility, rubber elasticity, and low temperature characteristics to the thermoplastic elastomer composition. Also, polyglycolic acid and polytrimethylene terephthalate based polymers are preferred since they can be produced from raw materials of plant origin, and have excellent mechanical strength. Further, polylactic acids and poly(3-hydroxybutyrate) polymers are preferred since they can be produced from raw materials of plant origin. Moreover, polylactic acids are preferred since they can be produced from raw materials of plant origin, and in light of the cost and availability. Furthermore, a poly(3-hydroxybutyrate) polymer may be used since it can be produced from raw materials of plant origin, and can impart excellent flexibility, rubber elasticity and low temperature characteristics to the resulting thermoplastic elastomer compositions. Among the thermoplastic resins which can be produced from raw materials of plant origin without depending on petroleum resources, polylactic acids and poly(3-hydroxybutyrate) polymers are more preferred.

In the present invention, the term "polylactic acid" refers to a polymer constituted with a monomer unit derived from L-lactic acid and/or D-lactic acid. Other monomer unit which is not derived from L-lactic acid or D-lactic acid may be included in the range not to impair the effects of the present invention.

As the method for production of the polylactic acid, any known arbitrary polymerization method can be employed. Most representatively known method is one in which lactide that is an anhydrous cyclic dimer of lactic acid is subjected to ring-opening polymerization (lactide method), however, lactic acid may be directly subjected to condensation polymerization. In addition, the molecular weight preferably falls within the range of 50,000 to 300,000 in terms of the weight average molecular weight. When the molecular weight is below such a range, mechanical physical properties and the like may not be achieved enough. To the contrary, when the molecular weight is beyond the above range, inferior processibility is likely to be exhibited.

When the polylactic acid is constituted with only a monomer unit derived from L-lactic acid and/or D-lactic acid, the polymer becomes crystalline and has a high melting point. Additionally, since crystallinity and melting point can be freely regulated by altering the proportion of the monomer unit derived from L-lactic acid and/or D-lactic acid (abbreviated as "L/D ratio"), predetermination corresponding to the heat resistance, molding flow performance, rubber elasticity and the like of the resulting thermoplastic elastomer can be executed. The polylactic acid is not particularly limited, and for example, a commercial product such as Lacea (registered trade name, manufactured by Mitsui Chemicals, Inc.) or the like can be used.

As the poly(3-hydroxybutyrate) polymer, for example, poly(3-hydroxybutyrate) homopolymers, copolymers of 3-hydroxybutyrate and hydroxyalkanoate other than 3-hydroxybutyrate, and the like may be exemplified. Examples of the hydroxyalkanoate other than 3-hydroxybutyrate in the case of the copolymer include 3-hydroxypropionate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxyundecanoate, 4-hydroxybutyrate, and hydroxylaurylate. Of these, copolymers constituted with the hydroxyalkanoate other than 3-hydroxybutyrate in an amount of equal to or less than 20% by mole are preferred since resin compositions particularly superior in the molding processibility can be obtained. Also, poly(3-hydroxybutyrate)

homopolymers, 3-hydroxybutyrate/3-hydroxyvalerate copolymers, 3-hydroxybutyrate/4-hydroxybutyrate copolymers, 3-hydroxybutyrate/3-hydroxyhexanoate copolymers are preferred since they can be readily obtained. Further, those produced in a microorganism are preferred as the poly (3-hydroxybutyrate) polymer because a resin composition excellent in the molding processibility can be produced, and production from a raw material of non-petroleum origin is enabled. Such a poly(3-hydroxybutyrate) polymer is available as a commercial product. Alternatively, production by the method or the like disclosed in, for example, U.S. Pat. No. 4,477,654, pamphlet of International Publication No. 94/11519, U.S. Pat. No. 5,502,273, and Japanese Unexamined Patent Application, First Publication No. 2006-045366 is also possible.

Examples of the polybutylene succinate polymer include: polybutylene succinate that is a copolymer of 1,4-butanediol and succinic acid; polybutylene succinate adipate that is a copolymer of 1,4-butanediol, succinic acid and adipic acid; and the like, which are polymerized using succinic acid synthesized from starch or cellulose as a raw material of non-petroleum origin. Of these, polybutylene succinate is preferred since it can be readily obtained.

Examples of the polytrimethylene terephthalate based polymer include polytrimethylene terephthalate that is a copolymer of terephthalic acid and 1,3-propane diol polymerized using 1,3-propane diol synthesized from starch or fatty oil as a raw material of non-petroleum origin, and the like.

The polyglycolic acid can be obtained by block ring-opening polymerization or solution ring-opening polymerization, for example, by heating glycolide (i.e., cyclic dimeric ester of glycolic acid) synthesized using a microorganism as a raw material of non-petroleum origin, in the presence of a catalyst (for example, a cationic catalyst such as organic tin carboxylate, halogenated tin, or halogenated antimony). A copolymer obtained by ring opening copolymerization of glycolide a comonomer that is copolymerizable with the same can be used as a polyglycolic acid.

Rubber (B)

The rubber (B) which can be used in the present invention is at least one rubber selected from a natural rubber, a diene polymer rubber, an olefin polymer rubber, an acrylic rubber and a silicone rubber. These rubber components may be used alone, or in combination.

In the present invention, those having a shape of sheet, block or the like by solidifying a latex liquid collected from rubber tree typified by seringa (hevea brasiliensis) may be exemplified as the natural rubber, which may be either dried by smoking, or dried without smoking, as long as it is produced in such a manner. Examples of the natural rubber having a sheet shape include ribbed smoked sheets (RSS), white crepes, pale crepes, estate brown crepes, compo crepes, thin brown crepes, thisk brown crepes, flat bark crepes, pure smoked blanket crepes, and the like. RSS involves various grades visually classified according to International Standards of Quality and Packing for Natural Rubber Grades, Green Book, generally referred to. As the natural rubber having a block shape, technically specified rubbers (TSR) referred to as crumb rubber or block rubber may be exemplified, and these include standard Malaysian rubbers (SMR), standard Singapore rubbers (SSR), standard Indonesian rubbers (SIR), standard Thai rubbers (STR), and the like. Among them, ribbed smoked sheets (RSS) are preferred taking into consideration the economical efficiency. In addition, deproteinized natural rubbers and epoxydized natural rubbers may be also exemplified as the natural rubber. The term "deproteinized natural rubber" refers to a rubber processed to remove the majority of the proteins included in a crude rubber. As the method for removing the protein, a method in which the latex collected from the rubber tree is sufficiently washed with water may be employed. Specifically, (i) a method in which aggregation of rubber particles in a highly diluted latex are allowed; (ii) a method in which a highly diluted latex is centrifuged with a centrifugal separator to separate the concentrated latex; (iii) a method in which the latex is dialyzed; and the like may be exemplified. In addition, other methods include: (a) a method in which the protein is subjected to decomposition with a bacterium or enzyme; (b) a method in which an alkali is added to the latex, followed by heating to allow the protein degradation; (c) a method in which the protein adsorbed to the rubber particles is released with a soap; and the like. These methods may be appropriately combined.

Moreover, the epoxydized natural rubber has a denatured form of the natural rubber in which the unsaturated linkage in the natural rubber is substituted with an epoxy group, and can be obtained by epoxy denaturation of the natural rubber latex. For example, ENR50 (trade name, manufactured by Gutherie, Inc.), ENR25 (trade name, manufactured by Gutherie, Inc.) have been marketed, and commonly available. In the resin composition of the present invention, a mixture of the natural rubber and the epoxydized natural rubber may be used.

In the aforementioned natural rubber, the deproteinized natural rubbers are preferred in light of stabilization of the physical properties of the resulting thermoplastic elastomer, and prevention from allergy resulting from the protein; the epoxydized natural rubbers are preferred in light of miscibility with the thermoplastic resin (A), and mechanical characteristics of the resulting thermoplastic elastomer composition; and the ribbed smoked sheets (RSS) are preferred in light of the cost and availability.

In the foregoing, examples of the diene based polymer rubber include, isoprene polymer rubber (IR), styrene-butadiene copolymer rubber (SBR), butadiene polymer rubber (BR), acrylonitrile-butadiene copolymer rubber (NBR), chloroprene polymer rubber (CR), and the like.

Further, examples of the olefin based polymer rubber include ethylene propylene diene copolymer rubber (EPDM), isobutylene isoprene copolymer rubber (IIR), halogenated isobutylene isoprene copolymer rubber (CIIR, BIIR), isobutylene halogenated methylstyrene copolymer rubber, chlorosulfonated polyethylene, isobutylene polymer rubber, ethylene vinyl acetate copolymer rubber, and the like.

Moreover, any of conventionally known acrylic rubbers can be used as the acrylic rubber, and examples thereof include acrylic rubbers constituted with copolymerization of a monomer consisting of ethyl acrylate and/or butyl acrylate with a small amount of one, or two or more of other monomers such as 2-chloroethyl vinyl ether, methyl vinyl ketone, acrylic acid, acrylonitrile and butadiene, and the like.

Still further, any of conventionally known silicone rubbers can be used as the silicone rubber, and examples thereof include dimethylsiloxane polymer rubber, methylphenylsiloxane polymer rubber, and the like.

In the thermoplastic elastomer composition of the present invention, the rubber (B) described above may be selected ad libitum taking into consideration the required physical properties, as well as the cost, availability, and the like. For example, to use the acrylic rubber is preferred in light of miscibility with the thermoplastic resin (A), and the mechanical characteristics of the resulting thermoplastic elastomer composition. Also, to use the silicone rubber is preferred in light of the low temperature characteristics and weather resistance of the resulting thermoplastic elastomer composition. Further, to use the diene based polymer rubber or the olefin based polymer rubber is preferred in light of the cost. In light of possibility of production from the raw material of plant origin without depending on petroleum resources, to use the natural rubber is preferred. Among all, the natural rubber is more preferred since it can be obtained from a raw material of plant origin without depending on petroleum resources, and can provide a thermoplastic elastomer composition accompanied by less environmental burden. Since the natural rubber is biodegradable, biodegradability can be imparted also to the thermoplastic elastomer composition when the natural rubber is used, whereby environmental burden can be further lessened.

In the present invention, the rubber (B) is melted and kneaded in the presence of the thermoplastic resin (A), and in this procedure, the crosslinking agent (C) is added to the mixture, thereby permitting dynamic crosslinking of the rubber (B) concomitantly with the melting and kneading (dynamic crosslinking). By thus carrying out the dynamic crosslinking, a phase morphology is likely to be provided in which the crosslinked product of the rubber (B) is dispersed in a continuous phase of the thermoplastic resin (A), and thus the molding flow performance and the mechanical characteristics of the resulting thermoplastic elastomer composition can be improved. Still further, even though the thermoplastic resin (A) is blended in an amount less than the amount of the rubber (B), the phase morphology in which the crosslinked product of the rubber (B) is dispersed in a continuous phase of the thermoplastic resin (A) can be provided, whereby the compression set properties and the rubber elasticity can be improved.

The dynamic crosslinking herein refers to a technique developed by W. M. Fischer et al., in Uniroyal Inc., and A. Y. Coran et al., in Monsanto Company (U.S. Pat. No. 104,210, All about Thermoplastic Elastomer, Mitsuo Akiba, Kogyo Chosakai Publishing Co., Ltd., 2003, first edition), and is a process in which: a rubber is blended into a thermoplastic resin matrix; and the rubber is highly crosslinked while kneading with a crosslinking agent at a temperature of no lower than the temperature at which crosslinking with the crosslinking agent is executed, and the rubber is finely dispersed. The composition obtained by this dynamic crosslinking exhibits physical properties similar to those of the crosslinked rubber since a state in which the crosslinked rubber phase (rubber (B) in the present invention) to be a discontinuous phase is finely dispersed in the thermoplastic resin (thermoplastic resin (A) in the present invention) to be a continuous phase is provided, and processing that meets the thermoplastic resin is enabled upon the molding processing. Moreover, also in the case in which the amount of the blended thermoplastic resin is below the amount of the crosslinked rubber blended, a state in which the crosslinked rubber phase to be a discontinuous phase is finely dispersed in the thermoplastic resin to be a continuous phase is provided.

The crosslinking agent (C) for obtaining the crosslinked product of the rubber (B) is not particularly limited, and any one of the crosslinking agents which have been conventionally used in each of such rubbers can be used. Examples of the crosslinking agent (C) for obtaining the crosslinked product of the rubber (B) include: sulfur; organic sulfur compounds; organic nitroso compounds such as aromatic nitroso compounds; oxime compounds; metal oxide such as zinc oxide and magnesium oxide; polyamines; selenium, tellurium and/or compounds thereof; various types of organic peroxides; resin crosslinking agents such as alkylphenol formaldehyde resins and brominated alkylphenol formaldehyde resins; organic organosiloxane based compounds having two or more SiH groups in the molecule; and the like. One or two or more types of the crosslinking agent can be used depending on the type and the like of the rubber. When the crosslinked product of the rubber (B) is obtained, in terms of the crosslinking efficiency of the rubber, rubber elasticity imparted to the resultant crosslinked product, the odor and the like, the crosslinking agent (C) is used in a proportion of preferably 0.3 to 30 parts by weight, more preferably 0.5 to 15 parts by weight, and particularly preferably 0.5 to 5 parts by weight based on 100 parts by weight of the rubber (B). When the crosslinking agent (C) is less than 0.3 parts by weight, insufficient crosslinking may be performed, whereby the rubber elasticity is likely to be deteriorated. In contrast, when the crosslinking agent (C) is more than 30 parts by weight, it is likely that the resulting composition may have a stronger odor, or may be colorized.

Furthermore, when the crosslinked product of the rubber (B) is obtained, in addition to the aforementioned crosslinking agent, one, or two or more crosslinking activators can be used as needed. Examples of the crosslinking activator include guanidine based compounds such as diphenyl guanidine, aldehyde amine based compounds, aldehyde ammonium compounds, thiazole based compounds, sulfenamide based compounds, thiourea based compounds, thiram based compounds, dithiocarbamate based compounds; hydrosilylated catalysts of group transition metals such as palladium, rhodium and platinum, or compounds and complexes of the same, and the like.

Moreover, when the crosslinked product of the rubber (B) is obtained, in addition to the aforementioned crosslinking agent and crosslinking activator, compounds such as divinylbenzene, ethylene glycol dimethacrylate, trimethylolpropane triacrylate, zinc oxide, N,N-m-phenylene bismaleimide, metal halide, organic halide, maleic anhydride, glycidyl methacrylate, hydroxypropyl methacrylate and stearic acid may be also used as needed. Addition of such a compound enables the crosslinking efficiency by the crosslinking agent to be improved, and also enables the rubber elasticity to be imparted.

Thermoplastic Elastomer Composition

The thermoplastic elastomer composition of the present invention is produced by dynamic crosslinking of the rubber (B) in the presence of the thermoplastic resin (A). It is preferred that a phase structure in which the crosslinked product of the rubber (B) be dispersed in a continuous phase of the thermoplastic resin (A) is provided.

More specifically, the thermoplastic elastomer composition is produced by melting and kneading a composition including the thermoplastic resin (A) and the rubber (B) at a high temperature, during which a crosslinking agent is added thereto, thereby allowing for crosslinking while kneading the rubber (B) (dynamic crosslinking). The thermoplastic elastomer composition can be produced with addition of other component such as plasticizer (D), compatibility accelerator (E), a stabilizer such as an ultraviolet ray absorbing agent or an antioxidant, a filler such as calcium carbonate, carbon black, silica or talc, a reinforcing agent, a lubricant such as a stearic acid metal salt, wax or silicone oil, a flame retardant such as magnesium hydroxide, a pigment such as carbon black or titanium oxide, a crystal nucleating agent such as talc, clay or mica, tackifier, and the like as needed. Also in such addition, components derived from a non-petroleum source are more preferred in light of possibility of reduction of the environmental burden. As the component derived from a non-petroleum source, natural products, derivatives of natural products, matters produced by fermentation of raw materials of plant origin, matters produced in a microorganism using a non-petroleum source, and the like are exemplified. For example, vitamins and the like as an antioxidant, beef tallow and the like as a lubricant, terpene and the like as a tackifier may be involved.

The thermoplastic elastomer composition of the present invention includes the thermoplastic resin (A) in a proportion of preferably 5 to 300 parts by weight based on 100 parts by weight of the content of the rubber (B), more preferably 5 to 150 parts by weight based on 100 parts by weight of the rubber (B), still more preferably 10 to 90 parts by weight based on 100 parts by weight of the rubber (B), and particularly preferably 15 to 50 parts by weight based on 100 parts by weight of the rubber (B). When the polymer (A) is included in an amount of more than 300 parts by weight based on 100 parts by weight of the rubber (B), thermoplastic the compression set and the permanent tensile elongation of the elastomer composition may be increased, and thus the rubber elasticity, elastic recovery properties, and flexibility are likely to be deteriorated. In such instance, sealing performances will be deteriorated in use for seal products, and the like. To the contrary, when the thermoplastic resin (A) is included in an amount of less than 5 parts by weight based on 100 parts by weight of the rubber (B), the melt viscosity of the thermoplastic elastomer composition is elevated, leading to failure in achieving sufficient melt flow performance in molding processing, and thus the formability is likely to be deteriorated. Additionally, a phase structure in which the rubber (B) is dispersed in a continuous phase of the thermoplastic resin (A) is less likely to be formed, and thus mechanical characteristics such as tensile strength and tensile elongation tend to be deteriorated.

In addition, the thermoplastic elastomer composition of the present invention, strain amount in compressive deformation as determined by leaving to stand under a condition of the atmospheric temperature being 70° C., and the amount of the compression deformation being 25% for 22 hrs according to JIS-K 6301 is preferably no greater than 80%, more preferably no greater than 65%, and particularly preferably no greater than 50%, in light of exhibiting the properties as an elastomer.

Moreover, in the thermoplastic elastomer composition of the present invention, the amount of gel in the thermoplastic elastomer composition, i.e., gel ratio (wt %) represented by the following formula (1) is preferably 20 to 95%, and more preferably 40 to 85%. By rendering the gel ratio (wt %) of the thermoplastic elastomer composition fall within the range of 20 to 95% as described above, the crosslinked product of the rubber (B) can be allowed to be present in the thermoplastic resin (A) with a stable phase morphology, whereby formability can be improved, and the compression set of the thermoplastic elastomer composition can be reduced. In addition, the gel ratio (wt %) falling within the above range, a thermoplastic polymer composition having a strain amount in compressive deformation of no higher than 65% as determined by leaving to stand under a condition of the atmospheric temperature being 70° C., and the amount of the compression deformation being 25% for 22 hrs according to JIS K6301 can be readily prepared.

$$\text{gel ratio (wt \%)} = (Wc/Wu) \times 100 \qquad (1)$$

In the formula, Wc represents a weight (g) of content insoluble in the solvent of the thermoplastic elastomer composition, and Wu represents a weight (g) of the thermoplastic elastomer composition.

The gel ratio (wt %) is determined based on the above formula (1) by measuring the weight of a certain amount of the thermoplastic elastomer composition specified as Wu (g), and then measuring the weight (Wc) (g) of the content that is insoluble in the solvent of the thermoplastic elastomer composition after keeping Wu (g) of the thermoplastic elastomer composition placed in the solvent for 12 hrs followed by drying the content that is insoluble in the solvent to specify in terms of the weight of the dried content insoluble in the solvent. The solvent herein refers to a solvent which can dissolve the thermoplastic resin (A) and uncrosslinked rubber (B), and may be selected ad libitum depending on the thermoplastic resin (A) and rubber (B) employed.

The amount of the gel may be measured appropriately during the dynamic crosslinking so as to regulate such that the crosslinking of the rubber is completed sufficiently while testing the degree of progress of the rubber crosslinking.

Furthermore, in the thermoplastic elastomer composition of the present invention, the gel ratio (wt %:% by weight) of the rubber (B) is preferably no less than 70%, more preferably no less than 80%, and particularly preferably no less than 95%. When the gel ratio (wt %) of the rubber (B) is less than 70%, the rubber elasticity, the compression set properties, and the mechanical strength of the resulting thermoplastic elastomer composition are likely to be deteriorated. The gel ratio (wt %) of the rubber (B) may be determined by the following formula, provided that the content of the rubber (B) in the compounded mixture is specified as T (%).

$$\text{Gel ratio (wt \%)} = (Wc/(Wu \times T \times 0.01)) \times 100 \qquad (2)$$

Furthermore, when the thermoplastic elastomer composition of the present invention is observed with a transmission electron microscope on its phase morphology, it is preferred that:

(a) phase morphology in which the crosslinked product of the rubber (B) is dispersed in a continuous phase of the thermoplastic resin (A) is provided; or (b) phase morphology in which the thermoplastic resin (A) and the crosslinked product of the rubber (B) form a continuous phase is provided. It is more preferred that (a) phase morphology in which the crosslinked product of the rubber (B) is dispersed in a continuous phase of the thermoplastic resin (A) is provided.

For reference, the phrase "the thermoplastic resin (A) and the crosslinked product of the rubber (B) form a continuous phase" herein refers to the phase morphology in which the thermoplastic resin (A) and the crosslinked product of the rubber (B) are present to form a continuous boundary (line). That is, the state (3) among the following states (1) to (3) is referred to.

(1) A state in which the crosslinked product of the rubber (B) is islet dispersed in a continuous phase of the thermoplastic resin (A) (scattering state).

(2) A state in which the thermoplastic resin (A) is islet dispersed in the continuous phase of the crosslinked product of the rubber (B) (scattering state).

(3) A state in which the thermoplastic resin (A) and the crosslinked product of the rubber (B) are present to form a continuous boundary (line).

When the thermoplastic elastomer composition has the above phase morphology (a) or (b), the formability of the thermoplastic elastomer composition is improved, and thus molded articles having the less compression set and compression permanent elongation are likely to be manufactured. In addition, when the composition has the above phase morphology (a), the formability of the thermoplastic elastomer composition is improved, whereby molded articles having the less compression set and compression permanent elongation can be manufactured, which are also likely to be superior in mechanical characteristics such as tensile strength, tensile elongation and the like. Therefore, the composition having the above phase morphology (a) is more preferred.

Herein, the crosslinked product of the rubber (B) has a particle size of preferably 0.01 to 20 μm, more preferably 0.01 to 10 μm, and still more preferably 0.01 to 5 μm, because molded articles having particularly excellent various characteristics described above tend to be available when the article size is 0.01 to 20 μm.

Furthermore, number average of the ratio d1/d2, i.e., ratio of the longitudinal particle diameter d1 and the transverse particle diameter d2 is preferably 1 to 5, more preferably 1 to 3, and particularly preferably 1 to 1.5. When the number average of the ratio d1/d2 exceeds 5, mechanical physical properties of the resulting thermoplastic elastomer composition are likely to be deteriorated.

Unlike the above phase morphology (a) and (b), melt flow performance of the polymer composition is reduced, and physical properties of the molded articles obtained by melt processing are likely to be deteriorated when the phase morphology in which the thermoplastic resin (A) is dispersed in the continuous phase of the crosslinked product of the rubber (B) is involved.

For reference, the phase morphology, and the particle size and particle volume of the crosslinked product of the rubber (B) of the present invention can be determined from a transmission electron micrograph taken by an ultrathin sectioning method. When the thermoplastic elastomer composition of the present invention is observed with a transmission electron microscope, thin film of the thermoplastic elastomer composition is first prepared by a freezing microtome, and stained using a stain such as ruthenium tetraoxide, osmium tetraoxide, chlorosulfonic acid, uranyl acetate, phosphotungstic acid, iodine ion, trifluoroacetic acid or the like. Upon selection of the stain, it is necessary to select the best suited stain depending on the thermoplastic resin (A) and the rubber (B) included in the thermoplastic elastomer composition to be an object for observation.

The particle size and the particle volume of the crosslinked product of the rubber (B) may be determined by calculating on each of 500 particles of the crosslinked product of the rubber (B) in the transmission electron micrograph of the resulting thermoplastic elastomer composition taken by an ultrathin sectioning method with the following process. More specifically, the particle size of each particle may be determined by measuring area S of each particle, and deriving $(4S/p)^{0.5}$ as the particle size of each particle, based on thus measured S. The weight average particle size is employed as the mean particle size is, while the particle shape is represented by the ratio d1/d2 of the longitudinal particle diameter d1 and the transverse particle diameter d2. In addition, the particle volume is defined by $S^{1.5}$ (3/2nd power of the particle area S), and the total particle volume is determined as sum of volume of each particle. Even though particles of 0.01 to 20 μm are present, when they aggregate and in contact with one another, a lump of the aggregated particles was considered as one particle.

The phase morphology in the thermoplastic elastomer composition is affected by the contents of components such as thermoplastic resin (A), rubber (B), crosslinking agent (C), and the additives in the thermoplastic elastomer composition, as well as melting and kneading conditions in preparing the thermoplastic elastomer composition, and the like. Therefore, it is preferred that the polymer composition be prepared so that any of the aforementioned phase morphology (a) or (b) is provided by regulating such factors described above.

In the thermoplastic elastomer composition having any one of the phase morphology (a) or (b) of the present invention, the thermoplastic resin (A) derived from a non-petroleum source is, following disposal, relatively easily degraded by, for example, sunlight, rain water, microorganisms, and the like in outdoor environments. In such a case, when the rubber (B) is a substance which is comparatively resistant to degradation in outdoor environments, the rubber (B) is turned into "fine powder" or "sponge-like shape having a large surface area" after the resin (A) is decomposed. More specifically, in the case of the thermoplastic elastomer composition having the phase morphology (a) or (b) of the present invention, the surface area of the rubber (B) following the decomposition of the resin (A) is significantly increased, therefore, the rubber (B) is also degraded relatively easily. Further, when the rubber (B) is a natural rubber, the environmental burden can be further lessened since degradation is more easily carried out.

Plasticizer (D)

In the present invention, the plasticizer (D) may be added in order to impart still further flexibility, rubber elasticity, and low temperature characteristics to the manufactured thermoplastic elastomer composition, or in order to adjust the hardness. Although the plasticizer (D) is not particularly limited, illustrative examples include e.g., plasticizers which are commonly blended into thermoplastic resins; process oils; oligomers; oil contents such as animal oils and vegetable oils, and derivatives thereof; petroleum fractions such as kerosene, light oil, heavy oil and naphtha, and the like. These may be used alone, or two or more may be used as a mixture.

Further specific examples include phthalic acid derivatives such as dimethyl phthalate, diethyl phthalate, di-n-butyl phthalate, di-(2-ethylhexyl) phthalate, diheptyl phthalate, diisodecyl phthalate, di-n-octyl phthalate, diisononyl phthalate, ditridecyl phthalate, octyldecyl phthalate, butylbenzyl phthalate, and dicyclohexyl phthalate; isophthalic acid derivatives such as dimethyl isophthalate; tetrahydrophthalic acid derivatives such as di-(2-ethylhexyl) tetrahydrophthalate; adipic acid derivatives such as dimethyl adipate, dibutyl adipate, di-n-hexyl adipate, di-(2-ethylhexyl) adipate, isononyl adipate, diisodecyl adipate, and dibutyl adipate diglycol; azelaic acid derivatives such as di-2-ethylhexyl azelate; sebacic acid derivatives such as dibutyl sebacate; dodecane-2-acid derivatives; maleic acid derivatives such as dibutyl maleate, and di-2-ethylhexyl maleate; fumaric acid derivatives such as dibutyl fumarate; trimellitic acid derivatives such as tris-2-ethylhexyl trimellitate; pyromellitic acid derivatives; citric acid derivatives such as acetyl tributyl citrate; itaconic acid derivatives; oleic acid derivatives; ricinoleic acid derivatives; stearic acid derivatives; lactic acid derivatives; other fatty acid derivatives; sulfonic acid derivatives; phosphoric acid derivatives; glutaric acid derivatives; glycol derivatives which are polymers of polyester based plasticizers being polymers of dibasic acid such as adipic acid, azelaic acid or phthalic acid, glycol and monovalent alcohol, glycerin derivatives, paraffin derivatives such as chlorinated paraffin, epoxy derivatives polyester based polymerized plasticizers, polyether based polymerized plasticizers, carbonate derivatives such as ethylene carbonate and propylene carbonate, and the like. Commercially available plasticizers include ADEKA CIZER O-130P, C-79, UL-100, P-200, RS-735 (manufactured by Asahi Denka Co., Ltd.) Lactcizer GP-2001, GP-4001 (manufactured by Arakawa Chemical Industries, Ltd.), RIKEMAL PL-019 (manufactured by Riken Vitamin Co., Ltd.), and the like. Plasticizers having a high molecular weight other than these compounds include acrylic polymers, polypropylene glycol based polymers, polytetrahydrofuran based polymers, polyisobutylene based polymers, copolymers of polylactic acid and polyester.

Illustrative examples of the aforementioned process oil include petroleum based process oils such as paraffin oil, naphthene based process oil and aromatic process oil, and the like. The vegetable oils include, for example, castor oil, cottonseed oil, linseed oil, rapeseed oil, soybean oil, palm oil, coconut oil, peanut oil, pine oil, tall oil, rhodine, and the like.

In the present invention, the plasticizer (D) is not limited thereto, but a variety of plasticizers can be used. Among these, plasticizers derived from non-petroleum sources are more preferred since they are produced from resource materials without depending on petroleum, and the environmental burden can be reduced. The plasticizer derived from a non-petroleum source includes natural products, derivatives of a natural product, products obtained by fermentation of a raw material of plant origin, products obtained in a microorganism using a non-petroleum source, and the like. Among these, at least one selected from an animal oil, a vegetable oil, an animal oil derivative, a vegetable oil derivative, and a lactic acid derivative is particularly preferred in light of favorable cost and availability.

In the present invention, the plasticizer (D) is included in the range of preferably 0.1 to 200 parts by weight, more preferably 0.1 to 100 parts by weight, still more preferably 1 to 50 parts by weight, and particularly preferably 5 to 30 parts by weight based on 100 parts by weight of the rubber (B). When the plasticizer (D) is included in an amount of less than 0.1 parts by weight, less rubber elasticity, and inferior low temperature characteristics are imparted to the resulting thermoplastic elastomer composition, while the amount exceeding 100 parts by weight tends to result in deterioration of the mechanical characteristics and heat resistance of the resulting thermoplastic elastomer composition.

Compatibility Accelerator (E)

In the present invention, a variety of graft polymers and block polymers may be added to compatibility accelerator in order to achieve favorable miscibility of the thermoplastic resin (A) with the rubber (B). By improving the miscibility of the thermoplastic resin (A) with the rubber (B), the particle size of the crosslinked product of the rubber (B) in the resulting thermoplastic elastomer composition is likely to be no greater than 20 μm, whereby the melt flow performance, and the mechanical characteristics of the thermoplastic elastomer composition tend to be improved.

Specific examples of the compatibility accelerator include commercial products such as Clayton Series (manufactured by Shell Japan, Co., Ltd.,), Tuftec™ Series (manufactured by Asahi Kasei Chemicals Corporation), Dynalon (manufactured by Japan Synthetic Rubber Co., Ltd), EPOFRIEND (manufactured by Daicel Chemical Industries, Ltd.), SEPTON (manufactured by Kuraray Co., Ltd.), NOFALLOY® (manufactured by NOF Corporation), Rexpearl (manufactured by Japan Polyolefins Co., Ltd.), Bondfast (manufactured by Sumitomo Chemical Co., Ltd.), Bondine (manufactured by Sumitomo Chemical Co., Ltd.), Admer (manufactured by Mitsui Chemicals, Inc.), Youmex (manufactured by Sanyo Chemical Industries, Ltd.), VMX (manufactured by Mitsubishi Chemical Corporation), Modiper (manufactured by NOF Corporation), Staphyloid (manufactured by Takeda Chemical Industries, Ltd.), Kane Ace (manufactured by Kanegafuchi Chemical Ind. Co., Ltd.), Rezeta (manufactured by Toagosei Chemical Industry Co., Ltd.), PLAMATE (manufactured by Dainippon Ink And Chemicals, Incorporated), and the like. These may be selected ad libitum depending on the thermoplastic resin (A) and the rubber (B) employed. Among them, the compatibility accelerator (for example, Bondfast and Bondine) having a epoxy group or an acid anhydride group reactive with a hydroxyl group or a carboxyl group at the end of the thermoplastic resin (A) is more preferred in light of a great effect of improving miscibility.

In the present invention, the compatibility accelerator (E) is included in the range of preferably 0.1 to 10 parts by weight, more preferably 0.5 to 5 parts by weight, and particularly preferably 1 to 3 parts by weight based on 100 parts by weight of the rubber (B). When the compatibility accelerator (E) is included in an amount of less than 0.1 parts by weight, less effect of improving the miscibility is achieved, and the effect of improving the mechanical characteristics of the resulting thermoplastic elastomer composition is likely to be reduced. When the compatibility accelerator (E) is included in an amount of more than 10 parts by weight, molding performances of the resulting thermoplastic elastomer composition may be deteriorated, whereby the proportion of the polymer in which a raw material of plant origin with no dependency on petroleum resources is used as a thermoplastic elastomer composition can be lowered.

The thermoplastic elastomer composition of the present invention may be prepared so as to meet the desired hardness, mechanical characteristics, compression set properties and the like, but in light of achieving characteristics as an elastomer such as the aforementioned compression set properties, and capability of contributing to reduction of carbon dioxide gas emission and lowering of the environmental burden as a thermoplastic elastomer composition constituted with a material derived from a non-petroleum source, it is particularly preferred that: the thermoplastic resin (A) is constituted with a polylactic acid or poly(3-hydroxybutyrate) polymer; the rubber (B) is constituted with a natural rubber; and a phase structure is provided in which the crosslinked product of the rubber (B) is dispersed in the thermoplastic resin (A). Moreover, plasticizer (D) may be also added ad libitum when further flexibility and compression set property are to be imparted, the plasticizer (D) is preferably an animal oil, a vegetable oil, an animal oil derivative, a vegetable oil derivative, or a lactic acid derivative in light of non-petroleum source. Additionally, in light of the mechanical characteristics, a compatibility accelerator for the thermoplastic resin (A) with the rubber (B) may be also added. Furthermore, in light of the compression set properties, provided that the amount of the natural rubber blended into the thermoplastic elastomer composition is 100 parts by weight, it is particularly preferred that the polylactic acid or poly(3-hydroxybutyrate) polymer be included at a proportion of 15 to 50 parts by weight.

Furthermore, in light of capability of contributing to the amount of carbon dioxide gas emission, and reducing the environmental burden, the component derived from a non-petroleum source is included in an amount of preferably no less than 20% by weight, more preferably no less than 60% by weight, still more preferably no less than 80% by weight, and particularly preferably no less than 90% by weight of the preferred entire composition.

Method for Production of Thermoplastic Elastomer Composition

The method for producing the thermoplastic elastomer composition of the present invention is not particularly limited as long as the rubber (B) can be (dynamically) crosslinked concomitant with melting and kneading the rubber (B) in the presence of the thermoplastic resin (A), and thus the thermoplastic resin (A), the rubber (B) and the aforementioned component used as the case may be can be uniformly mixed. In particular, the method for production which enables the phase morphology (a) or (b) described above to be formed is preferably used.

As the method of dynamically crosslinking the rubber (B) with the crosslinking agent (C) concomitant with melting and kneading of the rubber (B) in the presence of the thermoplastic resin (A), the following methods may be illustrated.

For example, when the thermoplastic elastomer composition of the present invention is produced using a batch-wise kneading apparatus or an internal formula kneading apparatus such as a plastomill, a method may be employed in which all components other than the crosslinking agent (also the plasticizer in some cases) are mixed beforehand with Brabender, a banbury mixer, kneader, or roll to permit melting and kneading until a uniform mixture is yielded, and then the crosslinking agent (C) is added thereto, followed by stopping the melting and kneading when the crosslinking reaction is satisfactorily complete.

In this method, with respect to the time period of the melting and kneading after the addition of the crosslinking agent, it is desired in terms of sufficient crosslinking of the rubber (B) that after the addition of the crosslinking agent (C), significant elevation of the torque value and the electric current of the motor of the kneading machine after the addition followed by reaching to maximum and thereafter falling again is confirmed, and then the kneading is continued until the torque value and electric current are stabilized at a constant level.

In addition, when the thermoplastic elastomer composition of the present invention is produced using a continuous melting and kneading apparatus such as a single screw extruder or a biaxial extruder, applicable methods include: a method in which all components other than the crosslinking agent (also the plasticizer in some cases) are pelletized after melting and kneading beforehand with a melting and kneading apparatus such as an extruder, followed by dry blending the crosslinking agent with the pellet, and thereafter further melting and kneading with a melting and kneading apparatus such as an extruder to allow the rubber (B) to be dynamically crosslinked, thereby producing the thermoplastic elastomer composition containing the thermoplastic resin (A) and the crosslinked product of the rubber (B); a method in which all components other than the crosslinking agent (also the plasticizer in some cases) are melted and kneaded with a melting and kneading apparatus such as an extruder, and the crosslinking agent (also the plasticizer in some cases) is added thereto from the course of the cylinder of the extruder followed by additional melting and kneading to allow the rubber (B) to be dynamically crosslinked, thereby producing the thermoplastic elastomer composition containing the thermoplastic resin (A) and the crosslinked product of the rubber (B); and the like.

When the aforementioned method is performed in which melting and kneading accompanied by concomitantly occurring dynamically crosslinking is carried out, the melting and kneading temperature may be predetermined ad libitum depending on the thermoplastic resin (A) used, the temperature of 100 to 250° C. is preferred, and a temperature of 150 to 200° C. is more preferably employed. When the temperature is lower than 100° C., melting of the thermoplastic resin (A) is likely to be insufficient. In contrast, when the temperature is higher than 250° C., the thermoplastic resin (A) itself is likely to be degraded.

The pelletizing method of the thermoplastic elastomer composition obtained by the method for production described above is not particularly limited, and a known pelletizing machine such as strand cut, under water cut, mist cut, hot cut or the like may be used. In this procedure, an adhesion preventive may be also added for the purpose of preventing from blocking of the pellets with one another.

The thermoplastic elastomer composition of the present invention is thermoplastic, and can be molded using a molding method and molding apparatus which is commonly employed for thermoplastic polymer compositions. A variety of molded articles and products having any arbitrary shape and size can be produced by melt molding with injection molding such as, for example, extrusion molding, press molding, blow molding or the like.

The thermoplastic elastomer composition of the present invention can be recycled, and thus can be responsible for reduction of the amount of carbon dioxide gas emission as a thermoplastic elastomer composition constituted with a material derived from a non-petroleum source, thereby enabling the reduction of the environmental burden. Therefore, the composition of the present invention can be suitably used as molded articles for automobile, electrical appliances or office supplies, as well as molded articles for miscellaneous goods, in which a conventional thermoplastic elastomer may be used.

Particularly, the thermoplastic elastomer composition of the present invention can be suitably used in manufacturing generally used molded articles such as bands, grips, switches, cover materials, sheets, vessels, packages, lures, sandals and miscellaneous goods such as toys, as well as materials for tight sealing such as sealing materials, packing materials and gaskets, and the like taking advantage of its characteristics such as excellent molding processibility, compression set resistance properties, sealing properties, flexibility, dynamic characteristics, and the like.

EXAMPLES

Next, the present invention is explained in more detail by way of Examples, but the present invention should not be construed as being limited only to these Examples.

In the Examples: PLA represents polylactic acid; PHBH represents a poly(3-hydroxybutyrate/3-hydroxyhexanoate) copolymer, 3-hydroxyhexanoate in PHBH being 5 (mol %); PBS represents polybutylene succinate; EPDM represents an ethylene-propylene-diene copolymer; NR represents a natural rubber; and EDMA represents ethylene glycol dimethacrylate. Herein, PLA and PHBH derived from a nonpetroleum source were used as a thermoplastic resin. PHBH employed was produced from a microorganism, and had a Mw of 640,000.

Test Method

Hardness

In accordance with JIS K6253, the hardness at 23° C. (JIS A hardness) was determined.

Mechanical Characteristics

In accordance with JIS K7113, Autograph AG-10TB manufactured by Shimadzu Corporation was used to determine tensile fracture strength and tensile fracture elongation. The determination was carried out with the number "n" of 3, and the average of values of strength (MPa) and elongation upon fracture (%) of the test piece was adopted. The test piece used had a shape of No. 2(⅓) type, and a thickness of about 2 mm. The test was performed at 23° C. with a test speed of 500 mm/min. The test piece employed was conditioned prior to the test at a temperature of 23±2° C., and a relative humidity of 50±5% for 48 hrs or longer.

Compression Set

In accordance with JIS K6301, a cylindrical molded product (circular cylindrical molded product having a diameter of 30 mm and a thickness of 12 mm) was kept under a condition of a compression rate being 25% at 70° C. for 22 hrs, and left to stand at room temperature for 30 min. Then, the thickness of the molded product was measured to determine the residual ratio of the distortion. For reference, the compression set of 0% corresponds to the case in which the distortion is completely recovered, while the compression set of 100% corresponds to the case in which the distortion is not recovered at all.

Thermoplasticity

After the test sample was kneaded with Laboplastmill 50C150 (blade shape: roller type R60 manufactured by Toyo Seiki Seisaku-sho, Ltd.), it was molded by hot pressing at 50 kgf and 180° C. for 5 min (manufactured by SHINTO Metal Industries Corporation, compression molding machine NSF-50). Thus, determination was made based on whether or not a cylindrical molded product (circular cylindrical molded product having a diameter of 30 mm and a thickness of 12 mm) could be formed. In production of the cylindrical molded product, a metal mold with a circular cylindrical opening having a diameter of 30 mm and a thickness of 12 mm was used. The evaluation was made by deciding: "A" when the molding could be completed without yielding any unmelted portion; or "B" when the molding could not be completed with accompanying unmelted portion. The unmelted portion was decided by visual observation.

Gel Ratio (wt %)

Using the sheet-form molded product obtained in Examples and Comparative Examples, the gel ratio of the thermoplastic elastomer composition was determined. The sheet-form molded product in an amount of 1 g was wrapped with a 350-mesh stainless wire netting, and immersed in a solvent of toluene/chloroform=1/1 for 12 hrs. After the immersion, the wire netting was removed, followed by vacuum drying at 80° C. Thus, the content that is insoluble in the solvent was determined.

Observation of Phase Morphology

Sampling was conducted from the center section (circle centroid, section having a thickness of 6 mm) of the cylindrical molded product (circular cylindrical molded product having a diameter of 30 mm and a thickness of 12 mm) obtained in Examples, and a thin section was prepared with a freezing microtome. The section was stained with osmium tetraoxide, and observed with a transmission electron microscope (JEOL, Ltd. JEM-1200EX).

Example 1

PLA; LACEA H-100 (manufactured by Mitsui Chemicals, Inc.) and EPDM; EP22 (manufactured by JSR Corporation), and Bondfast 7M (manufactured by Sumitomo Chemical Co., Ltd.) that is a copolymer of ethylene, glycidyl methacrylate and methyl acrylate as a compatibility accelerator were melted and kneaded at a ratio (parts by weight) shown in Table 1 using Laboplastmill 50C150 (blade shape: roller type R60 manufactured by Toyo Seiki Seisaku-sho, Ltd.) which had been preset at 180° C. Furthermore, EDMA as a crosslinking activator, and Perhexine 25B (manufactured by NOF Corporation) that is a peroxide as a crosslinking catalyst were added to the mixture at a ratio (parts by weight) shown in Table 1, while melting and kneading with a screw rotation frequency of 100 rpm at 180° C. The melting and kneading was carried out until the torque value exhibited the maximum level, and thereafter declined to reach a constant level, whereby the crosslinking reaction was allowed to proceed (dynamic crosslinking). Thus resulting sample was molded by hot pressing at a preset temperature of 180° C. (compression molding machine NSF-50 manufactured by SHINTO Metal Industries Corporation) to obtain a circular cylindrical molded product having a diameter of 30 mm and a thickness of 12 mm. With respect to the molded product, the hardness, and the compression set were determined, and the thermoplasticity was evaluated. In addition, the hot pressing molding was carried out in a similar manner at a preset temperature of 180° C. to obtain a sheet-form molded product having a thickness of 2 mm. The mechanical characteristics, and the gel ratio (wt %) were determined with this sheet. In this Example, 30 g of EPDM was melted and kneaded.

Example 2

PLA; LACEA H-100 (manufactured by Mitsui Chemicals, Inc.) and EPDM; EP22 (manufactured by JSR Corporation), and Bondfast 7M were melted and kneaded at a ratio (parts by weight) shown in Table 1 using Laboplastmill 50C150 (blade shape: roller type R60 manufactured by TOYO SEIKI Co., Ltd.) which had been preset at 180° C. Furthermore, EDMA as a crosslinking activator, and Perhexine 25B (manufactured by NOF Corporation) that is a peroxide as a crosslinking catalyst were added to the mixture at a ratio (parts by weight) shown in Table 1, while melting and kneading with a screw rotation frequency of 100 rpm at 180° C. The melting and kneading was carried out until the torque value exhibited the maximum level, and thereafter declined to reach a constant level, whereby the crosslinking reaction was allowed to proceed (dynamic crosslinking). Furthermore, after the torque reached a constant value, Lactcizer GP-4001 (manufactured by Arakawa Chemical Industries, Ltd.) that is a plasticizer produced using a fermented lactic acid material was added at a ratio (parts by weight) shown in Table 1, followed by melting and kneading. Thus resulting sample was molded by hot pressing at a preset temperature of 180° C. (compression molding machine NSF-50 manufactured by SHINTO Metal Industries Corporation) to obtain a circular cylindrical molded product having a diameter of 30 mm and a thickness of 12 mm. With respect to the molded product, the hardness, and the compression set were determined, and the thermoplasticity was evaluated. In addition, the hot pressing molding was carried out in a similar manner at a preset temperature of 180° C. to obtain a sheet-form molded product having a thickness of 2 mm. The mechanical characteristics, and the gel ratio (wt %) were determined with this sheet. In this Example, 30 g of EPDM was melted and kneaded.

Example 3

A sample was produced in a similar manner to Example 1 except that NR; RSS3 was used in place of EPDM, and that the amount of added Perhexine 25B (manufactured by NOF Corporation) was changed. Thus, evaluation was carried out.

Example 4

A sample was produced in a similar manner to Example 2 except that NR; RSS3 was used in place of EPDM, and that the amount of added Perhexine 25B (manufactured by NOF Corporation) was changed. Thus, evaluation was carried out.

Example 5

A sample was produced in a similar manner to Example 2 except that NR; RSS3 was used in place of EPDM, Bondfast 7M (manufactured by Sumitomo Chemical Co., Ltd.) was not blended, and that the amount of added Perhexine 25B (manufactured by NOF Corporation) was changed. Thus, evaluation was carried out. Additionally, observation of phase morphology of the resulting thermoplastic elastomer composition was carried out. The results are shown in the sole FIGURE of the drawings.

Example 6

PHBH and NR; RSS3 were melted and kneaded at a ratio (parts by weight) shown in Table 1 using Laboplastmill 50C150 (blade shape: roller type R60 manufactured by TOYO SEIKI Co., Ltd.) which had been preset at 160° C. Furthermore, EDMA as a crosslinking activator, and Perhexine 25B (manufactured by NOF Corporation) that is a peroxide as a crosslinking catalyst were added to the mixture at a ratio (parts by weight) shown in Table 1, while melting and kneading with a screw rotation frequency of 100 rpm at 160° C. The melting and kneading was carried out until the torque value exhibited the maximum level, and thereafter declined to reach a constant level, whereby the crosslinking reaction was allowed to proceed (dynamic crosslinking). Thus resulting sample was molded by hot pressing at a preset temperature of 160° C. (compression molding machine NSF-50 manufactured by SHINTO Metal Industries Corporation) to obtain a circular cylindrical molded product having a diameter of 30 mm and a thickness of 12 mm. With respect to the molded product, the hardness, and the compression set were determined, and the thermoplasticity was evaluated. In addition, the hot pressing molding was carried out in a similar manner at a preset temperature of 160° C. to obtain a sheet-form molded product having a thickness of 2 mm. The gel ratio (wt %) was determined with this sheet. In this Example, 30 g of NR was melted and kneaded.

Comparative Example 1

PLA; LACEA H-100 (manufactured by Mitsui Chemicals, Inc.) was melted and kneaded using Laboplastmill 50C150 (blade shape: roller type R60 manufactured by Toyo Seiki Seisaku-sho, Ltd.) preset at 180° C. for 10 min with a screw rotation frequency of 100 rpm. Thus resulting sample was evaluated similarly to Example 1. In this Comparative Example, 50 g of PLA was melted and kneaded.

Comparative Example 2

PLA; LACEA H-100 (manufactured by Mitsui Chemicals, Inc.) and NR; RSS3, and Bondfast 7M (manufactured by Sumitomo Chemical Co., Ltd.) were melted and kneaded using Laboplastmill 50C150 (blade shape: roller type R60 manufactured by Toyo Seiki Seisaku-sho, Ltd.) preset at 180° C. for 10 min with a screw rotation frequency of 100 rpm. Thus resulting sample was evaluated similarly to Example 1. In this Comparative Example, 30 g of NR was melted and kneaded.

Comparative Example 3

PLA; LACEA H-100 (manufactured by Mitsui Chemicals, Inc.) and NR; RSS3, and Bondfast 7M (manufactured by Sumitomo Chemical Co., Ltd.) were melted and kneaded using Laboplastmill 50C150 (blade shape: roller type R60 manufactured by Toyo Seiki Seisaku-sho, Ltd.) preset at 180° C. for 10 min with a screw rotation frequency of 100 rpm. Moreover, Lactcizer GP-4001 (manufactured by Arakawa Chemical Industries, Ltd.) was added thereto at a ratio (parts by weight) shown in Table 1, and the mixture was melted and kneaded. Thus resulting sample was evaluated similarly to Example 1. In this Comparative Example, 30 g of NR was melted and kneaded.

Comparative Example 4

Using Laboplastomill 50C150 (blade shape: roller type R60 manufactured by Toyo Seiki Seisaku-sho, Ltd.) preset at 180° C., EDMA as a crosslinking activator, and Perhexine 25B (manufactured by NOF Corporation) that is a peroxide as a crosslinking catalyst were added to NR; RSS3 at a ratio (parts by weight) shown in Table 1, while melting and kneading at a screw rotation frequency of 100 rpm at 180° C. The melting and kneading was carried out until the torque value exhibited the maximum level, and thereafter declined to reach a constant level, whereby the crosslinking reaction was allowed to proceed. Furthermore, PLA; LACEA H-100 (manufactured by Mitsui Chemicals, Inc.) and Bondfast 7M (manufactured by Sumitomo Chemical Co., Ltd.) were added thereto at a ratio (parts by weight) shown in Table 1, and the mixture was melted and kneaded for 10 min. Thus resulting sample was evaluated similarly to Example 1. In this Comparative Example, 30 g of NR was melted and kneaded.

TABLE 1

|  |  | Example | | | | | | Comparative Example | | | |
|---|---|---|---|---|---|---|---|---|---|---|---|
|  |  | 1 | 2 | 3 | 4 | 5 | 6 | 1 | 2 | 3 | 4 *1) |
| Compounded blend | | | | | | | | | | | |
| Thermoplastic resin (A) | PLA | 30 | 30 | 30 | 30 | 30 |  | 100 | 30 | 30 | 30 |
|  | PHBH |  |  |  |  |  | 30 |  |  |  |  |
| Rubber (B) | EPDM | 100 | 100 |  |  |  |  |  |  |  | 100 |
|  | NR |  |  | 100 | 100 | 100 | 100 |  | 100 | 100 |  |
| Crosslinking activator | EDMA | 1 | 1 | 1 | 1 | 1 | 1 |  |  |  | 1 |
| Crosslinking agent (C) | Perhexine 25B | 2 | 2 | 3 | 3 | 3 | 3 |  |  |  | 2 |
| Compatibility accelerator (E) | Bondfast 7M | 3.3 | 3.3 | 3.3 | 3.3 |  |  |  | 3.3 | 3.3 | 3.3 |
| Plasticizer (D) | GP-4001 |  | 20 |  | 20 | 20 |  |  |  | 20 |  |
| Physical properties | | | | | | | | | | | |
| Hardness JIS-A |  | 88 | 66 | 82 | 50 | 59 | 41 | >98 | 15 | 8 | 62 |
| Compression set (%) |  | 79 | 42 | 55 | 43 | 33 | 39 | 100 | 100 | 100 | *2) |

TABLE 1-continued

|  |  | Example | | | | | | Comparative Example | | | |
|---|---|---|---|---|---|---|---|---|---|---|---|
|  |  | 1 | 2 | 3 | 4 | 5 | 6 | 1 | 2 | 3 | 4 *1) |
| Mechanical characteristics | Fracture strength (MPa) | 6 | 3.8 | 4.0 | 2.4 | 6.4 | — | 4.4 | 0.12 | <0.1 | 1.8 |
|  | Elongation upon fracture (%) | 187 | 245 | 115 | 188 | 192 | — | <10 | 155 | 138 | 17 |
|  | Modulus of elasticity (MPa) | 42.5 | 3.7 | 16.1 | 1.7 | 10.2 | — | 484 | <0.5 | <0.5 | 11 |
| Thermoplasticity | | A | A | A | A | A | A | A | A | A | B |
| Gel ratio (wt %) | | 71 | 61 | 55 | 53 | 48 | 82 | 0.5 | 0.7 | 1.7 | 70 |

*1) Not a product of dynamic crosslinking of the rubber (B) in the presence of the thermoplastic resin (A), but a blend of crosslinked product of EPDM and PLA (prepared by blending PLA after producing the crosslinked product of EPDM beforehand).
*2) Not determined since the molded product collapsed in compression for the determination. In this Table, the amount of each blended component is represented in terms of "parts by weight".

As is clear from Table 1 (Examples 1 to 6 and Comparative Example 1), the thermoplastic elastomer composition of the present invention is superior in the flexibility and the compression set properties as compared with one that includes PLA alone. Furthermore, it is revealed to have thermoplasticity. In addition, as is clear from comparison of Examples 1 to 6 with Comparative Examples 2 to 3, it is proven that the gel ratio (wt %) is elevated (i.e., the rubber (B) is crosslinked), and excellent mechanical characteristics and compression set properties can be imparted by carrying out the dynamic crosslinking. Moreover, as is clear from comparison of Examples 1 to 5 with Comparative Example 4, the thermoplastic elastomer composition that is a dynamic cross-linked polymer of the present invention is revealed to have favorable formability (thermoplasticity) and be superior in mechanical characteristics and compression set, as compared with ones produced by adding the thermoplastic resin (PLA) and Bondfast 7M to the crosslinked product of the rubber (EPDM) followed by kneading, without carrying out the dynamic crosslinking. Furthermore, as is clear from the sole FIGURE of the drawings, the thermoplastic elastomer composition of the present invention is proven to have phase morphology in which a crosslinked product having a size of no greater than 10 μm and including a rubber (NR) as a principal component is dispersed in the continuous phase including a thermoplastic resin (PLA) as a principal component.

From the foregoing results, it is revealed that the thermoplastic elastomer composition of the present invention is a novel thermoplastic elastomer having superior mechanical characteristics and compression set properties accompanied by less environmental burden, although it has flexibility with a low hardness.

INDUSTRIAL APPLICABILITY

Since the thermoplastic elastomer composition of the present invention is a novel thermoplastic elastomer having low hardness, and being superior in mechanical characteristics and compression set properties accompanied by less excellent environmental burden while having flexibility, it can be suitably used as molded articles for automobile, electrical appliances or office supplies, as well as molded articles for miscellaneous goods, in which a conventional thermoplastic elastomer may be used.

In particular, the thermoplastic elastomer composition of the present invention can be suitably used in manufacturing generally used molded articles such as bands, grips, switches, cover materials, sheets, vessels, packages, lures, sandals and miscellaneous goods such as toys, as well as materials for tight sealing such as sealing materials, packing materials and gaskets, and the like taking advantage of its characteristics such as excellent molding processibility, compression set resistance properties, sealing properties, flexibility, dynamic characteristics, and the like.

The invention claimed is:

1. A thermoplastic elastomer composition comprising a thermoplastic resin (A) which is at least one polymer selected from the group consisting of a polylactic acid, a poly(3-hydroxybutyrate) polymer, a polybutylene succinate polymer and a polyglycolic acid, and at least one rubber (B) selected from a natural rubber, an acrylic rubber and a silicone rubber, the thermoplastic elastomer composition being obtained by allowing the rubber (B) to be dynamically crosslinked with a crosslinking agent (C) in the presence of the thermoplastic resin (A), and
   the composition comprises 10 to 90 parts by weight of the thermoplastic resin (A) based on 100 parts by weight of the rubber (B), and has a phase morphology in which a crosslinked product of the rubber (B) is dispersed in a continuous phase of the thermoplastic resin (A).

2. The thermoplastic elastomer composition according to claim 1 wherein a crosslinked product of the rubber (B) has a particle size of 0.01 to 20 μm.

3. The thermoplastic elastomer composition according to claim 2 wherein the crosslinked product of the rubber (B) has a particle size of 0.01 to 10 μm.

4. The thermoplastic elastomer composition according to claim 1 wherein the rubber (B) is a natural rubber.

5. The thermoplastic elastomer composition according to claim 1 wherein the thermoplastic resin (A) is polylactic acid or a poly(3-hydroxybutyrate) polymer.

6. The thermoplastic elastomer composition according to claim 1 further comprising a plasticizer (D).

7. The thermoplastic elastomer composition according to claim 1 further comprising a compatibility accelerator (E).

8. A molded article for automobiles wherein the composition according to claim 1 is employed.

9. A molded article for electrical appliances wherein the composition according to claim 1 is employed.

10. A molded article for office supplies wherein the composition according to claim 1 is employed.

11. A molded article for miscellaneous goods wherein the composition according to claim 1 is employed.

12. The thermoplastic elastomer composition according to claim 1, wherein the thermoplastic elastomer composition is obtained by allowing the rubber (B) to be dynamically crosslinked with a crosslinking agent (C) concomitantly with the melting and kneading of the rubber (B) in the presence of the thermoplastic resin (A) and the cros slinking agent (C).

* * * * *